US011865570B2

(12) United States Patent
Gray et al.

(10) Patent No.: US 11,865,570 B2
(45) Date of Patent: Jan. 9, 2024

(54) FLOW DIVIDER FOR SPINNER SPREADER

(71) Applicant: Salford Group Inc., Salford (CA)

(72) Inventors: Geof J. Gray, Burford (CA); Joshua Scott Fields, Clermont, GA (US); Steven Ray Owenby, Blairsville, GA (US); Richard Hagler, Gainesville, GA (US); Russell Mcever, Gainesville, GA (US); Brian Hobson, Pope, MS (US)

(73) Assignee: Salford Group Inc., Salford (CA)

(*) Notice: Subject to any disclaimer, the term of this patent is extended or adjusted under 35 U.S.C. 154(b) by 485 days.

(21) Appl. No.: 17/294,480

(22) PCT Filed: Jul. 22, 2019

(86) PCT No.: PCT/CA2019/051007
§ 371 (c)(1),
(2) Date: May 17, 2021

(87) PCT Pub. No.: WO2020/102878
PCT Pub. Date: May 28, 2020

(65) Prior Publication Data
US 2021/0402427 A1    Dec. 30, 2021

Related U.S. Application Data

(60) Provisional application No. 62/770,792, filed on Nov. 22, 2018.

(51) Int. Cl.
*B05C 19/04*    (2006.01)
*A01C 17/00*    (2006.01)
(Continued)

(52) U.S. Cl.
CPC ............ *B05C 19/04* (2013.01); *A01C 17/001* (2013.01); *A01C 17/008* (2013.01); *B05D 1/12* (2013.01);
(Continued)

(58) Field of Classification Search
CPC ....... B05C 19/04; B05C 19/008; B05C 19/06; A01C 17/001; A01C 17/008;
(Continued)

(56) References Cited

U.S. PATENT DOCUMENTS

| 3,889,883 A | * | 6/1975 | Anderson | ............. | E01C 19/203 |
| | | | | | 198/594 |
| 4,367,848 A | * | 1/1983 | Ehmke | ................. | A01C 17/006 |
| | | | | | 239/665 |

(Continued)

OTHER PUBLICATIONS

Office action dated Apr. 13, 2022 on Chinese application 201980089859.5.
(Continued)

*Primary Examiner* — Darren W Gorman
(74) *Attorney, Agent, or Firm* — Brunet & Co. Ltd.; Robert Brunet; Hans Koenig (57) ABSTRACT

A longitudinally adjustable flow divider situated in the particulate material path of a spinner spreader between the bin and the rotatable disc divides the particulate material so that the particulate material is dischargeable on to the upper surface of the rotatable disc on first and second laterally spaced apart longitudinally oriented drop lines. An actuator operably connected to the flow divider adjusts a longitudinal position of the flow divider to longitudinally adjust drop points on the drop lines at which the particulate material is dischargeable on to the rotatable disc. Longitudinal adjustment of the drop points along laterally spaced apart drop lines on one spinner disc permits control over spread pattern to help achieve uniform distribution of the particulate material on a ground surface.

20 Claims, 8 Drawing Sheets

(51) Int. Cl.
 B05D 1/12 (2006.01)
 E01C 19/20 (2006.01)
 E01H 10/00 (2006.01)

(52) U.S. Cl.
 CPC ......... E01C 19/203 (2013.01); E01H 10/007 (2013.01)

(58) Field of Classification Search
 CPC ....... A01C 17/006; B05D 1/12; E01C 19/203; E01C 2019/207; E01C 2019/2075; E01H 10/007
 See application file for complete search history.

(56) References Cited

U.S. PATENT DOCUMENTS

| | | | |
|---|---|---|---|
| 6,209,808 B1 | 4/2001 | Anderson | |
| 6,517,281 B1 | 2/2003 | Rissi | |
| 7,044,408 B2 * | 5/2006 | Schoenfeld | A01C 17/001 239/668 |
| 9,085,863 B2 | 7/2015 | Norkus et al. | |
| 9,107,349 B2 * | 8/2015 | Dilts | A01D 41/1243 |
| 9,206,563 B1 * | 12/2015 | Rissi | E01C 19/203 |
| 9,491,902 B1 * | 11/2016 | Kinkead | A01C 17/001 |
| 9,649,646 B1 | 5/2017 | Podoll et al. | |
| 2013/0233938 A1 | 9/2013 | Norkus et al. | |
| 2017/0273236 A1 * | 9/2017 | Owenby | E01C 19/201 |
| 2019/0047004 A1 * | 2/2019 | Anderson | A01C 17/006 |

OTHER PUBLICATIONS

Office action dated Oct. 17, 2022 on Chinese application 201980089859.5.

International Search Report and Written Opinion dated Sep. 27, 2019 on PCT/CA2019/051007.

* cited by examiner

FLOW DIVIDER FOR SPINNER SPREADER

CROSS-REFERENCE TO RELATED APPLICATIONS

This application is a national entry of International Application PCT/CA2019/051007 filed Jul. 22, 2019, which claims the benefit of U.S. Provisional Application Ser. No. 62/770,792 filed Nov. 22, 2018, the entire contents of both of which are herein incorporated by reference.

FIELD

This application relates to apparatuses for spreading particulate material.

BACKGROUND

Spinner spreaders are known in the art for broadcasting particulate material to a ground surface (e.g. an agricultural field, a road, and the like) for a variety of applications, for example, spreading fertilizer, fertilizer supplements, seed, sand, gravel, road salt, lime and the like. Spread pattern of the particulate material is dependent on spinner design, including size, placement and orientation of fins on a spinner disc, and on rotational speed of the disc. Distance to which particulate material is ejected may be controlled by the spinner design and the rotational speed of the disc, but control of the spread pattern and distribution of the particulate material may be unduly affected when the disc speed is changed. Control of the spread pattern and distribution of the particulate material become even more difficult when considering the use of the spinner spreader for different types of particulate material.

Therefore, there remains a need in the art for a multi-product spinner spreader that provides greater control over spread pattern and distribution of the particulate material.

SUMMARY

A longitudinally adjustable flow divider situated in a particulate material path of a spinner spreader between a bin and a rotatable disc divides the particulate material so that the particulate material is dischargeable on to an upper surface of the rotatable disc on first and second laterally spaced apart longitudinally oriented drop lines. An actuator operably connected to the flow divider adjusts a longitudinal position of the flow divider to longitudinally adjust drop points on the drop lines at which the particulate material is dischargeable on to the rotatable disc. Longitudinal adjustment of the drop points along laterally spaced apart drop lines on one spinner disc permits control over spread pattern to help achieve uniform distribution of the particulate material on a ground surface.

In one aspect, there is provided an apparatus for spreading particulate material, the apparatus comprising: a bin for holding particulate material; a rotatable disc for broadcasting the particulate material to a ground surface, the rotatable disc oriented to have an upper surface for receiving the particulate material; a conveyor for conveying the particulate material in a particulate material path from the bin to the upper surface of the rotatable disc; a longitudinally adjustable flow divider situated in the particulate material path between the bin and the rotatable disc, the flow divider receiving particulate material from the conveyor and dividing the particulate material so that the particulate material is dischargeable on to the upper surface of the rotatable disc on first and second laterally spaced apart longitudinally oriented drop lines; and, an actuator operably connected to the flow divider to adjust a longitudinal position of the flow divider to longitudinally adjust drop points on the drop lines at which the particulate material is dischargeable on to the rotatable disc.

In another aspect, there is provided a method of controlling distribution pattern of a particulate material broadcast to a ground surface by a spreading apparatus, the method comprising: conveying the particulate material from a bin to a rotatable disc for broadcasting the particulate material to the ground surface, the rotatable disc oriented to have an upper surface for receiving the particulate material thereon; dividing the particulate material into first and second portions; discharging the first portion of particulate material to a first drop point on the upper surface of the rotatable disc on a first longitudinally oriented drop line; discharging the second portion of particulate material to a second drop point on the upper surface of the rotatable disc on a second longitudinally oriented drop line spaced apart laterally from the first drop line; and, rotating the rotatable disc to broadcast the particulate material in a uniform distribution pattern on the ground surface.

In another aspect, there is provided a flow divider for a particulate material spreading apparatus, the flow divider comprising: a base; immovable walls extending upwardly from the base; and an immovable splitter extending upwardly from the base, the immovable walls and the immovable splitter defining first and second channels, the first and second channels immovable and laterally situated with respect to each other in relation to a longitudinal axis of the spreading apparatus, each channel comprising a funnel at a top of the channel for receiving particulate material from a conveyor of the apparatus and a discharge opening in the base at a bottom of the channel for discharging the particulate material on to a rotatable disc of the apparatus, the discharge openings of the first and second channels being laterally spaced apart, the first and second channels each further comprising a particulate material receiving surface, the receiving surface downwardly sloped at a non-90-degree angle from the top to the bottom of the channel.

In some embodiments, the first and second drop lines are the only drop lines. In some embodiments, the flow divider comprises first and second channels that receive the particulate material from the conveyor and discharge the particulate material at the drop points on the first and second drop lines, respectively. In some embodiments, the first and second channels are immovable with respect to each other and movable with the flow divider to longitudinally adjust the drop points of the particulate material on the drop lines on the rotatable disc. In some embodiments, the particulate material is divided equally between the first and second channels. In some embodiments, the particulate material is divided unequally between the first and second channels. In some embodiments, the rotatable disc has a center and the drop points are longitudinally adjustable along the drop lines at a distance in a range of about 2-12 inches from the center of the rotatable disc.

In some embodiments, the flow divider further comprises a base, immovable walls extending upwardly from the base and a splitter extending upwardly from the base. In some embodiments, the immovable walls and the splitter define the first and second channels. In some embodiments, the splitter is immovable. In some embodiments, the splitter is laterally movable to be able to adjust the relative amounts of particulate material being received by the first and second channels. In some embodiments, each channel comprises a funnel at a top of the channel for receiving the particulate material from the conveyor and a discharge opening in the base at a bottom of the channel for discharging the particulate material on to the rotatable disc. In some embodiments, the discharge openings of the first and second channels are laterally spaced apart to permit discharge of the particulate material on the first and second laterally spaced apart longitudinally oriented drop lines. In some embodiments, the first and second channels each comprise a particulate material receiving surface. In some embodiments, the receiving surface is downwardly sloped at a non-90-degree angle from the top to the bottom of the channel. In some embodiments, the splitter comprises first and second plate portions upwardly extending from the base and meeting at a top of the splitter to form a peak that divides the particulate material received from the conveyor between the first and second channels. In some embodiments, at least portions of the first and second plate portions extend upwardly at non-90-degree angles. In some embodiments, at least one of the plate portions forms the particulate material receiving surface of at least one of the channels.

In some embodiments, the rotatable disc comprises a plurality of fins mounted on the upper surface of the rotatable disc, the fins assisting with guiding and ejecting the particulate material. In some embodiments, there are four fins on the rotatable disc. In some embodiments, the fins form pairs of fins opposed across a center of the rotatable disc. In some embodiments, one or more of the fins on the rotatable disc have a different length than other fins in the rotatable disc. In some embodiments where there are four fins, two of the four fins are longer than the other two fins. In some embodiments, the two longer fins are of the same length and form a first pair of fins opposing each other across the center of the rotatable disc. In some embodiments, the two shorter fins are of the same length and form a second pair of fins opposing each other across the center of the rotatable disc. Having fins of different lengths on the same rotatable disc on which there are two laterally spaced-apart drop lines for particulate materials surprisingly provides even better uniformity of spread pattern. In some embodiments, providing the fins with angled or beveled top portions further optimizes performance of the spinner spreader.

In some embodiments, the rotatable disc comprises first and second rotatable discs laterally spaced apart across a longitudinal centerline between the discs. In some embodiments, the longitudinally adjustable flow divider comprises first and second longitudinally independently adjustable flow dividers positioned to discharge the particulate material on the first and second rotatable discs, respectively. In some embodiments, the laterally spaced apart longitudinally oriented drop lines on each of the first and second rotatable discs are between the longitudinal centerline of the apparatus and longitudinal centerlines of the respective rotatable discs.

In some embodiments, the method further comprises adjusting a longitudinal position of the first and second drop points on the first and second longitudinally oriented drop lines on the upper surface of the rotatable disc to provide the uniform distribution pattern of the particulate material on the ground surface. In some embodiments, one or more of conveyance speed of the particulate material, rotational speed of the rotatable disc and amount of particulate material discharged to the rotational disc are adjusted to provide the uniform distribution pattern of the particulate material on the ground surface.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which.

DETAILED DESCRIPTION

In the present specification, the term "longitudinal" refers to a direction parallel to a direction of ground movement of the spreader, and the term "lateral" refers to a direction perpendicular to the longitudinal direction in a plane substantially horizontal to the ground surface.

Referring to the Figures, one embodiment of an apparatus for spreading particulate material in the form of a spinner spreader 1 comprises a hopper 5 mounted on a frame 10, the frame 10 comprising a plurality of support rails for supporting the hopper 5 on the frame 10. The frame 10 is mounted on a vehicle (not shown), for example a truck, a trailer and the like. Depending on the vehicle, the frame 10 may be mounted directly on the vehicle, or the vehicle maybe equipped with an alternative frame and the frame 10 is replaced with a subframe for mounting on the alternative frame. The hopper 5 is designed to contain particulate material (e.g. fertilizer, fertilizer supplements, seed, sand, gravel, road salt, lime and the like) to be spread on a ground surface as the vehicle drives or is driven on or adjacent the ground surface.

The spinner spreader 1 further comprises a pair of adjacent conveyor belts 15 (individually labeled as 15a, 15b in FIG. 3B) situated at a bottom of the hopper 5 and oriented longitudinally with respect to direction of motion of the vehicle. The conveyor belts 15, also known as 'chains', transport the particulate material in the hopper 5 toward a rear of the hopper 5, and therefore toward a rear of the spinner spreader 1. The conveyor belts 15 comprise endless belts rotationally mounted on transversely oriented drive rollers 16 (individually labeled as 16a, 16b in FIG. 3B) located proximate the rear of the spinner spreader 1, and on transversely oriented idler rollers (not shown) located proximate a front of the spinner spreader 1 rotatably mounted in a bottom at a front of the hopper 5. There are separate drive rollers 16 and idler rollers for each conveyor belt 15 so that the conveyor belts may be driven independently, permitting driving the conveyor belts at different speeds, or even stopping one conveyor belt entirely, if desired. The ability to control conveyance speed of the particulate material contributes to the ability to provide a uniform distribution pattern of the particulate material on the ground surface.

The two drive rollers 16 are located in the bottom at a rear of the hopper 5, and are driven by hydraulic motors 17 (individually labeled as 17a, 17b) mounted on the frame 10 on opposites sides of the spinner spreader 1. The two idler rollers may be physically separated, or form a nested arrangement in which one of the idler rollers is hollow and a portion of the other of the idler rollers is mounted inside the hollow idler roller on bearings, permitting the two idler rollers to rotate independently. The conveyor belts 15 extend rearwardly past a rear wall 7 of the hopper 5 transporting the particulate material out of the hopper 5 through a rear hopper door 8 into a transition box 12. A hat 9 situated between the two conveyor belts 15 in the hopper 5 keeps the particulate material separated into two flow paths comprising equal amounts of particulate material.

Longitudinally translatable first flow divider 20 and independent longitudinally translatable second flow divider 21 are disposed below rear ends of the conveyor belts 15 to receive the particulate material flowing off the rear ends of the conveyor belts 15. The first flow divider 20 is associated with the conveyor belt 15a and receives the particulate material from the one conveyor belt. The second flow divider 21 receives the particulate material from the other conveyor belt 15b, thereby keeping the flow paths of particulate material separate. The longitudinally translatable flow dividers 20, 21 are described in more detail below. Particulate material from the flow dividers 20, 21 is discharged on to first and second rotatable spinner discs 40, 41, respectively, to be broadcast on to the ground surface. Thus, particulate material flowing from the hopper 5 is divided into two streams by the hat 9, one of the two streams being divided into another two streams by the first flow divider 20 and the other of the two streams being divided into another two streams by the second flow divider 21. Therefore, the particulate material is ultimately divided into four streams, two streams being discharged on to the first spinner disc 40 and two streams being discharged on to the second spinner disc 41.

The first and second rotatable spinner discs 40, 41 are disposed laterally adjacent to each other below the flow dividers 20, 21, respectively, at the rear of the spinner spreader 1. The spinner discs 40, 41 are horizontally oriented to have upper surfaces 42, 43, respectively, that receive the particulate material from the flow dividers 20, 21, respectively. Extending vertically upwardly from centers C0, C1 of the respective spinner discs 40, 41 are first and second spinner disc drive shafts 44, 45, respectively, operatively connected to first and second spinner drive motors 46, 47, respectively. The spinner drive motors 46, 47 rotationally drive the spinner disc drive shafts 44, 45, which rotate the spinner discs 40, 41 about respective rotational axes. The spinner drive motors 46, 47 are independently controllable to be able to rotate the spinner discs 40, 41 at different rotational speeds and/or in different angular directions, if desired. The ability to control rotational speed of the spinner discs 40, 41 contributes to the ability to provide a uniform distribution pattern of the particulate material on the ground surface. While the spinner discs 40, 41 may be rotated in either angular direction, the spinner discs 40, 41 are preferably rotated so that the first spinner disc 40 is rotated clockwise when viewed from the rear of the spinner spreader 1, while the second spinner disc 41 is rotated counterclockwise when viewed from the rear of the spinner spreader 1. Such preferred rotation results in an inside-out spreading of the particulate material. Particulate material dropping on to the upper surfaces 42, 43 of spinner discs 40, 41 is ejected by the spinner discs 40, 41 due to centrifugal forces imparted on the particulate material by the rotating spinner discs 40, 41. The upper surfaces 42, 43 of the spinner discs 40, 41 are equipped with radially oriented fins 48 (only one labeled) to assist with guiding and ejecting the particulate material.

Figure 6:
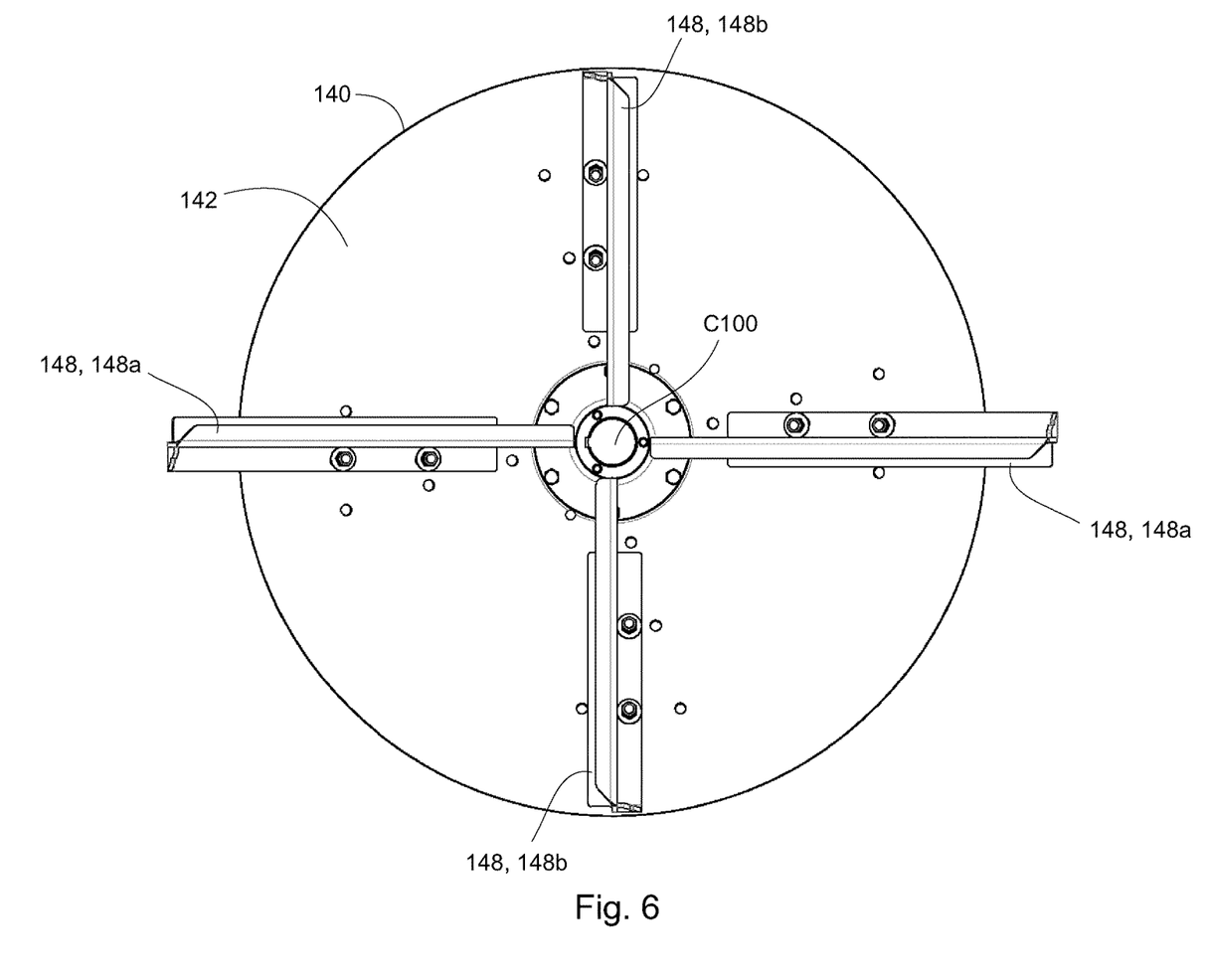
FIG. 6 depicts an embodiment of a spinner disc having four fins, two of which hare longer than the other two.

In some embodiments, as illustrated in FIG. 6, there are four fins 148 on an upper surface 142 of the same disc 140. Two of the four fins are longer fins 148a than the other two fins 148b. The two longer fins 148a are of the same length and form a first pair of fins opposing each other across a center C100 of the disc 140. The two shorter fins 148b are of the same length and form a second pair of fins opposing each other across the center C100 of the disc 140. The longer fins 148a are preferably about 41.6 cm long. The shorter fins 148b are preferably about 34.0 cm long. The disc 140 preferably has a radius of about 38.1 cm (76.2 cm diameter). The first pair of fins 148a are aligned with each other and form a right angle with the second pair of fins 148b, which are aligned with each other.

Referring specifically to FIG. 2A, FIG. 2B, FIG. 2C and FIG. 2D, the first flow divider 20 comprises a base 51 acting as a floor of the flow divider 20, a plurality of immovable walls 52, 53, 54, 55, 56 extending upwardly from the base 51 to form a box with compartments therein and an immovable splitter 60 extending upwardly from the base 51 inside the flow divider 20. The immovable walls 53, 54, 55, 56 and the immovable splitter 60 define first and second troughs 61, 62 inside the flow divider 20, the first and second troughs 61, 62 immovable and laterally situated with respect to each other in relation to a longitudinal axis of the flow divider 20. The first and second troughs 61, 62 comprise first and second funnels 63, 64, respectively, at tops of the first and second troughs 61, 62 for receiving particulate material from one of the conveyor belts 15 and first and second discharge openings 65, 66, respectively, in the base 51 at bottoms of the first and second troughs 61, 62 for discharging the particulate material on to the first rotatable spinner disc 40, the first and second discharge openings 65, 66 being laterally spaced apart. The first and second discharge openings 65, 66 are laterally spaced apart by a center-to-center distance $d_1$, which is preferably about 16 cm. At the first and second discharge openings 65, 66, the first and second troughs 61, 62 have a width $d_2$ determined from the desired distribution of particulate material in the spread pattern. The first and second troughs 61, 62 are channels within which the particulate material can flow from a top of the flow divider 20 out through a bottom of the flow divider 20.

The splitter 60 divides the flow of particulate material received from the conveyor belt 15a into two substantially equal portions, a first portion flowing into the first trough 61 and a second portion flowing into the second trough 62. The first and second troughs 61, 62 comprise first and second particulate material receiving surfaces 68, 69, respectively, which are downwardly sloped at non-90-degree angles from the top toward the bottom of the respective troughs 61, 62. The first receiving surface 68 comprises a top portion of a first plate portion 71 of the splitter 60, and the second receiving surface 69 comprises a top portion of the wall 53, the wall 53 also downwardly sloped at a non-90-degree angle from the top toward the bottom of the second trough 62 over at least a portion of the wall 53. The splitter 60 comprises the first plate portion 71 and a second plate portion 72, both extending upwardly from the base 51 and meeting at a top of the splitter 60 to form a peak 73 that divides the particulate material received from the conveyor 15a between the first and second troughs 61, 62. The first and second plate portions 71, 72 extend upwardly at non-90-degree angles over at least portions thereof. At the base 51, portions of the first and second plate portions 71, 72 and the walls 53, 54, which together form side walls of the first and second troughs 61, 62, extend substantially vertically from the base 51 so that particulate material flowing through the discharge openings 65, 66 drops substantially vertically downward on to the first rotatable spinner disc 40. The second flow divider 21 is a the same as the first flow divider 20 except that the second flow divider 21 is a mirror image of the first flow divider 20 taken through a vertical longitudinally oriented plane between the flow dividers 20, 21.

Figure 1A:
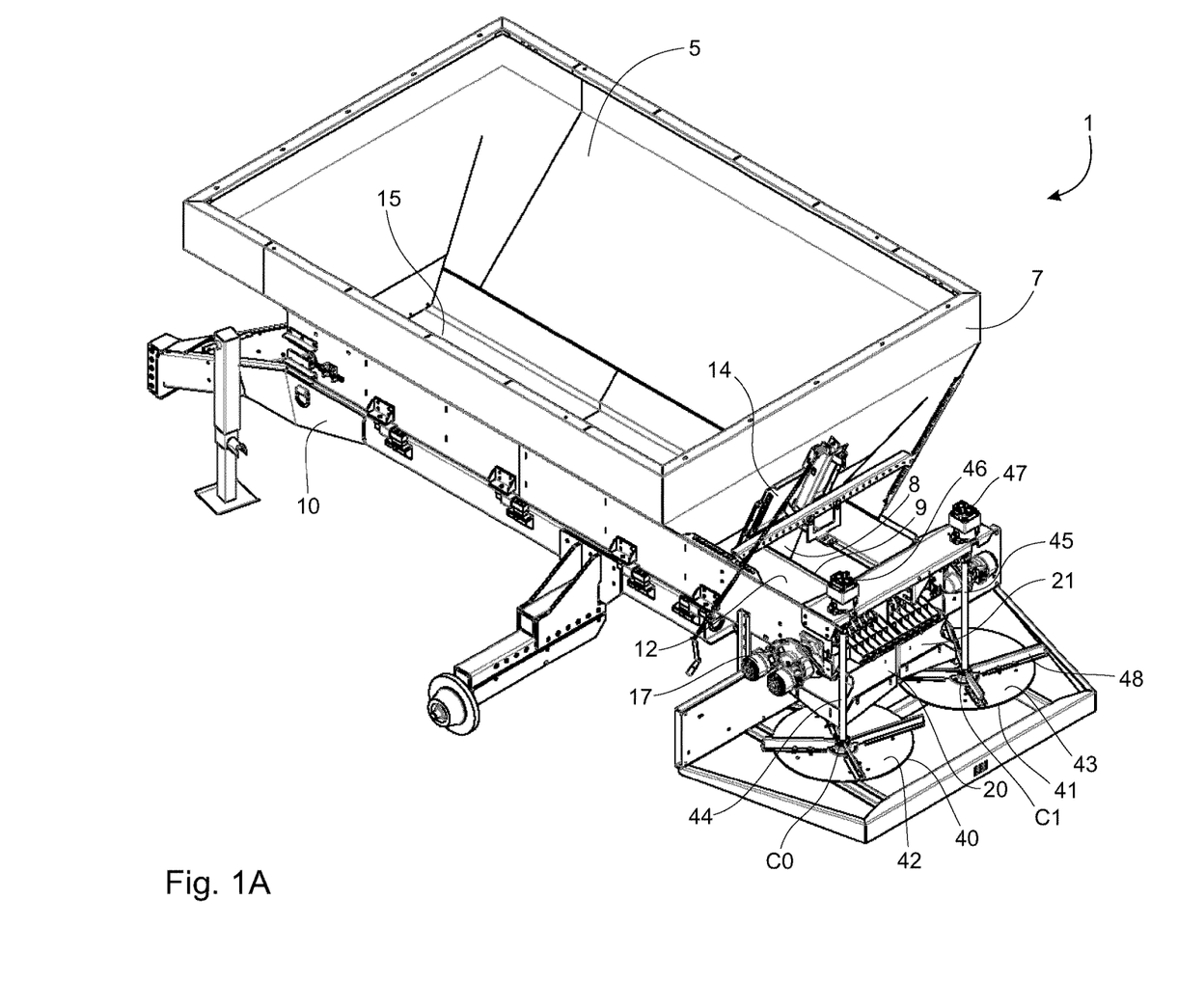
FIG. 1A depicts a rear perspective view of a spinner spreader with a flow divider of the present invention.
Figure 1B:
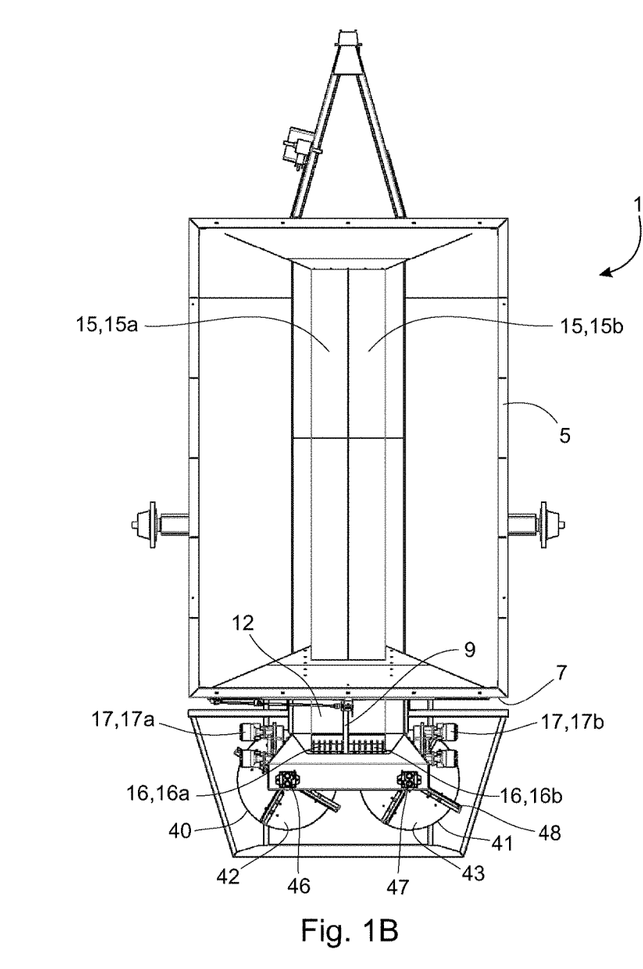
FIG. 1B depicts a top view of the spinner spreader of FIG. 1A.
Figure 1C:
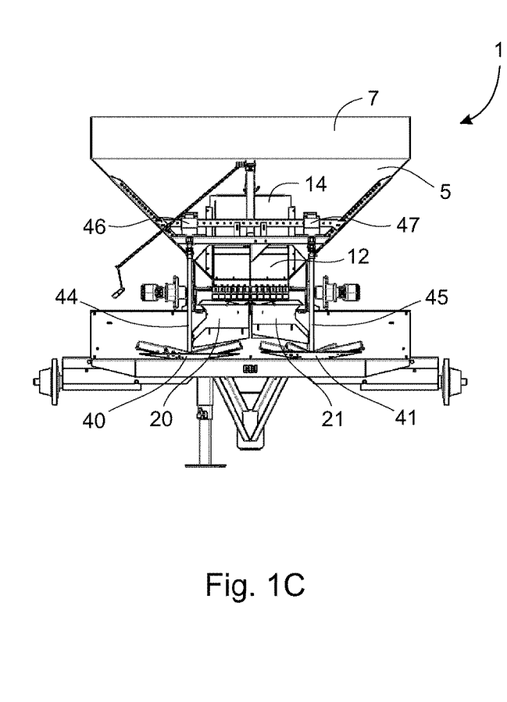
FIG. 1C depicts a rear view of the spinner spreader of FIG. 1A.
Figure 2A:
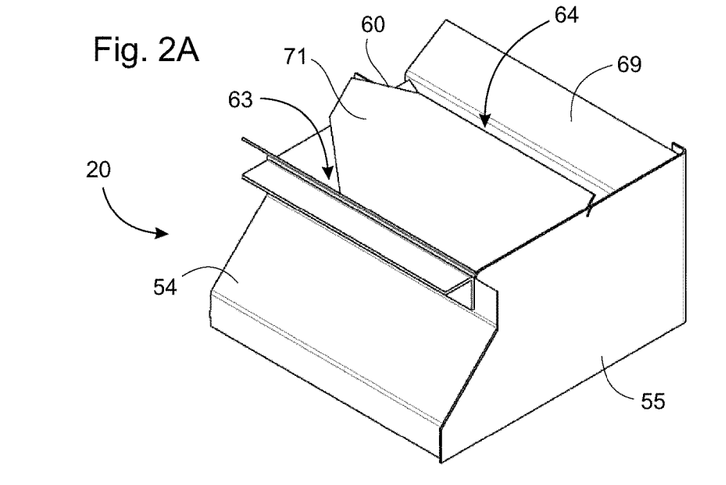
FIG. 2A depicts a rear left-side view of a flow divider utilized in the spinner spreader of FIG. 1A.
Figure 2B:
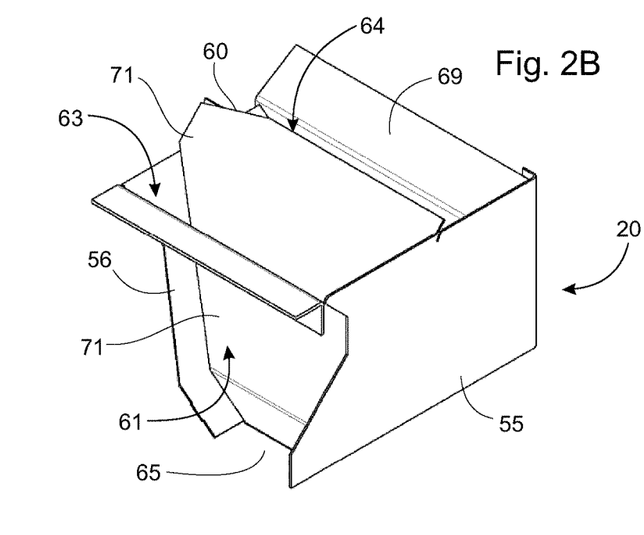
FIG. 2B depicts the flow divider of FIG. 5A with a side wall removed.
Figure 2C:
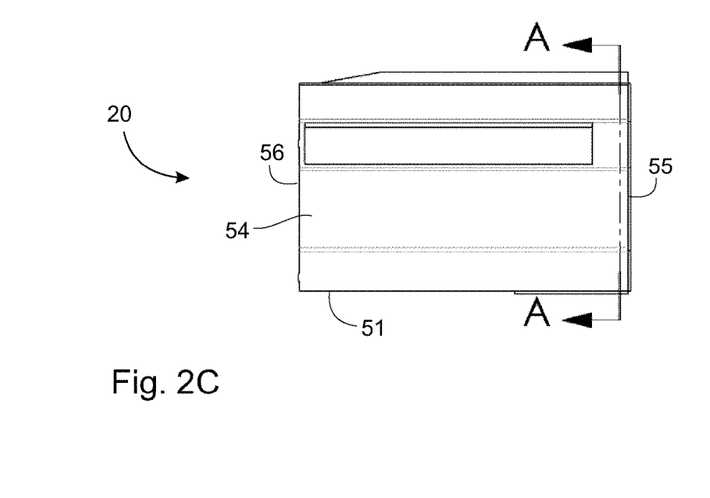
FIG. 2C depicts a left-side view of the flow divider of FIG. 5A.
Figure 2D:
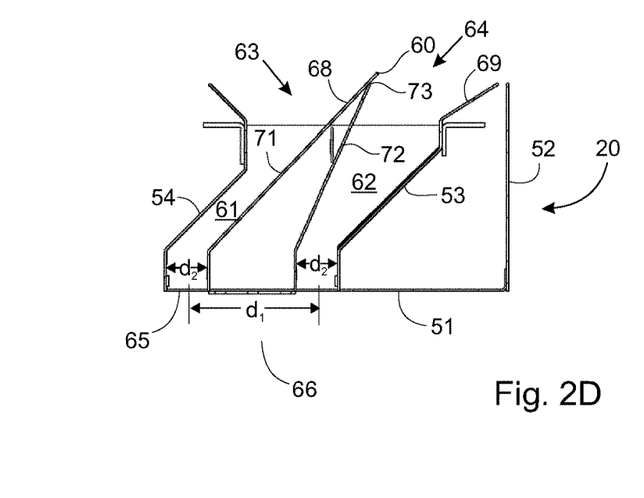
FIG. 2D depicts a section through A-A of FIG. 5A at a scale of 1:4.
Figure 3A:
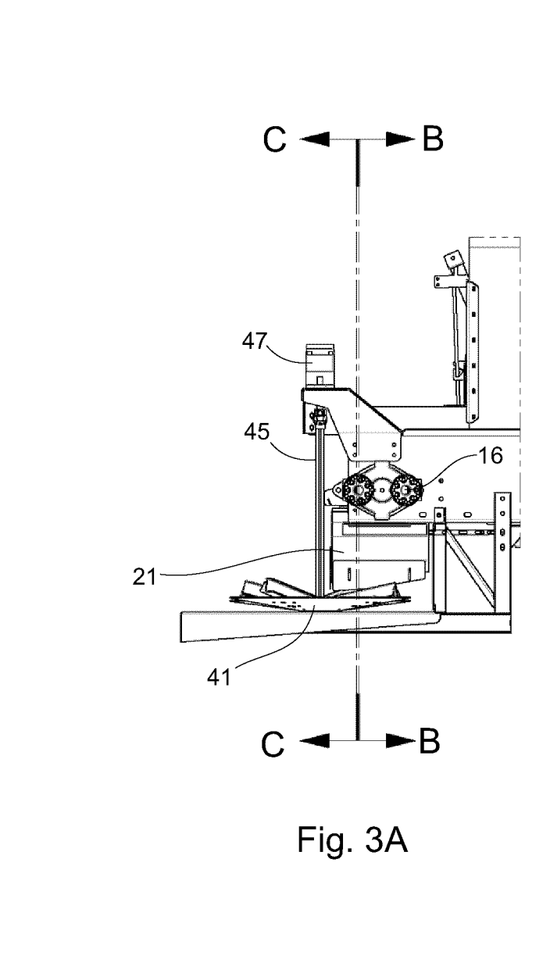
FIG. 3A depicts a right-side view of a spinner region of the spinner spreader of FIG. 1A.
Figure 3B:
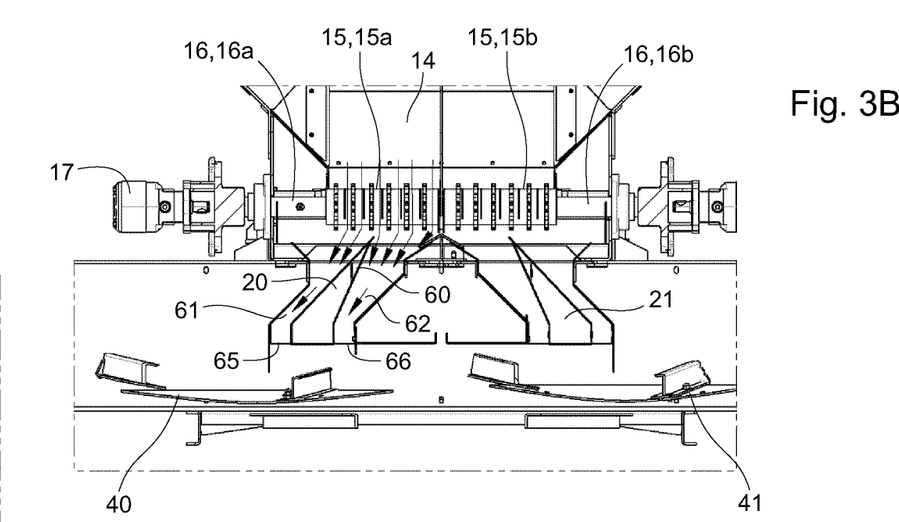
FIG. 3B depicts a section through B-B of FIG. 3A at a scale of 1:12 showing the spinner region viewed from rear to front.
Figure 3C:
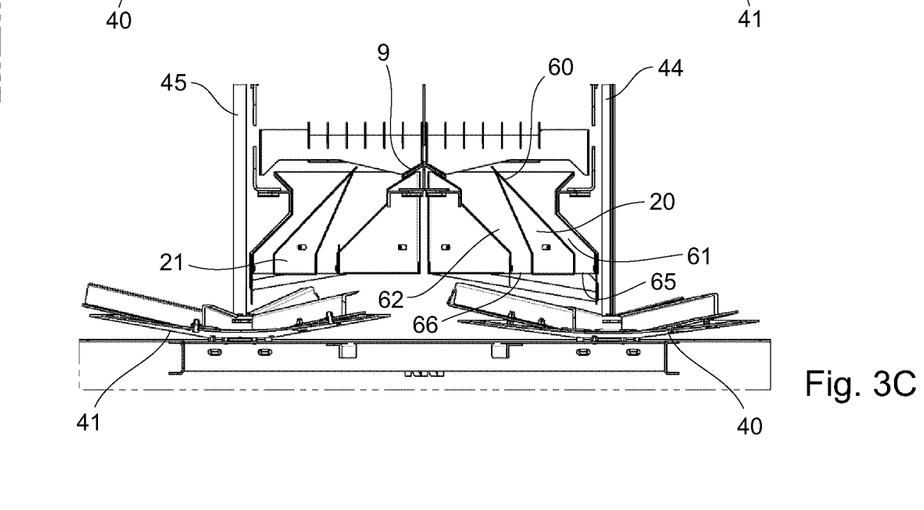
FIG. 3C depicts a section through C-C of FIG. 3A at a scale of 1:12 showing the spinner region viewed from front to rear.

Referring specifically to FIG. 3A, FIG. 3B, FIG. 3C, FIG. 4A, FIG. 4B, FIG. 4C, FIG. 4D and FIG. 4E, the first and second flow dividers 20, 21 are shown situated at the rear of the spinner spreader above the spinner discs 40, 41, respectively. The following discussion will refer to the first flow divider 20 and the first spinner disc 40, but is likewise descriptive of the second flow divider 21 and the second spinner disc 41. Arrows in FIG. 3B show flow of particulate material being received by the first flow divider 20 from the conveyor belt 15a, which is situated above the first flow divider 20, such that the splitter 60 splits the flow of particulate material into two streams of equal amount. One stream of particulate material flows into the first trough 61 and the other stream of particulate material flows into the second trough 62. The two streams of particulate material are discharged on to the upper surface 42 of the first spinner disc 40 through the discharge openings 65, 66, respectively, at laterally spaced apart drop points P, Q, respectively, that are on substantially the same laterally oriented line. The spaced apart drop points P, Q at which the particulate material is discharged from the discharge openings 65, 66 are to the 'inside' of the rotation axis of the first spinner disc 40, i.e. the drop points P, Q are on laterally spaced part longitudinally oriented drop lines on the lines X-X and Y-Y (see FIG. 4D) between the rotation axis of the spinner disc 40 and a longitudinal centerline of the spinner spreader 1. The drop points P, Q are laterally spaced apart by the distance $d_1$, which is the center-to-center distance between the first and second troughs 61, 62 as discussed above. Thus, the laterally spaced apart longitudinally oriented drop lines on each of the first and second rotatable discs 40, 41 are between the longitudinal centerline of the spinner spreader 1 and longitudinal centerlines of the respective spinner discs 40, 41. The provision of two troughs 61, 62 in the flow divider 20 provides two longitudinally oriented drop lines on the lines X-X and Y-Y on the first spinner disc 40. As discussed below, the two troughs 61, 62 are not independently moveable with respect to each other, therefore the drop points P, Q on the the first spinner disc 40 are also not independently moveable.

Figure 4A:
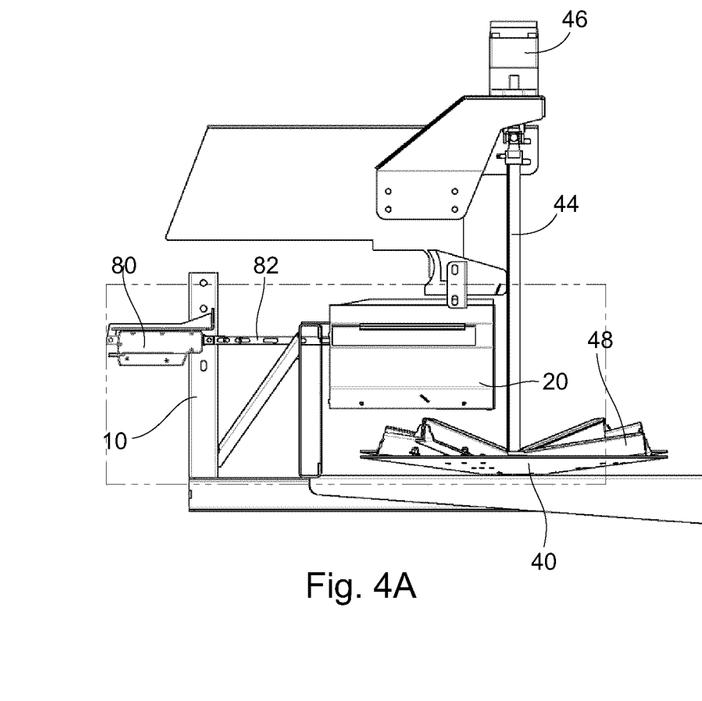
FIG. 4A depicts a left-side view of the spinner region of the spinner spreader of FIG. 1A.
Figure 4B:
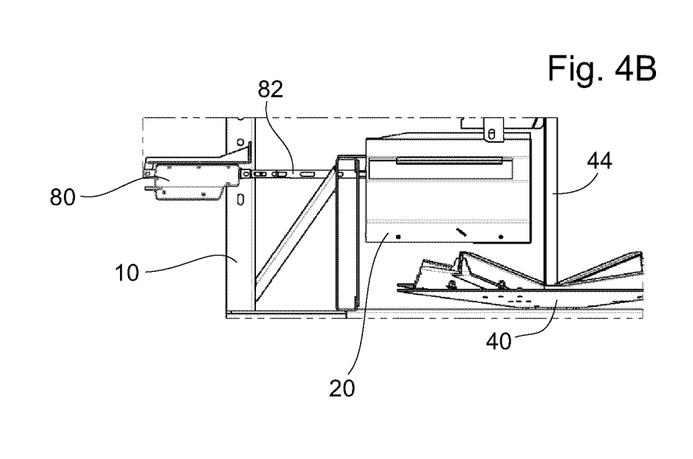
FIG. 4B depicts a magnified view of FIG. 4A showing a flow divider translated into a more rearward longitudinal position.
Figure 4C:
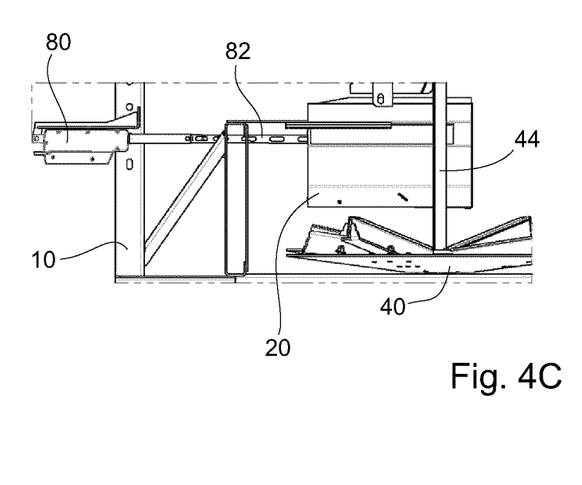
FIG. 4C depicts a magnified view of FIG. 4A showing a flow divider translated into a more frontward longitudinal position.
Figure 4D:
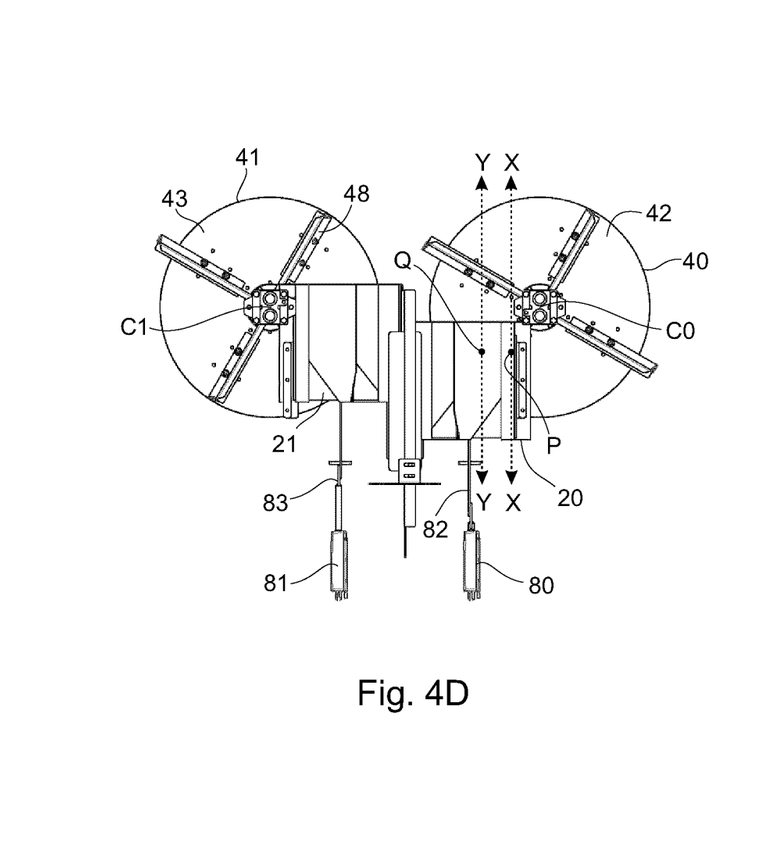
FIG. 4D depicts a top view of the spinner region of the spinner spreader of FIG. 1A.
Figure 4E:
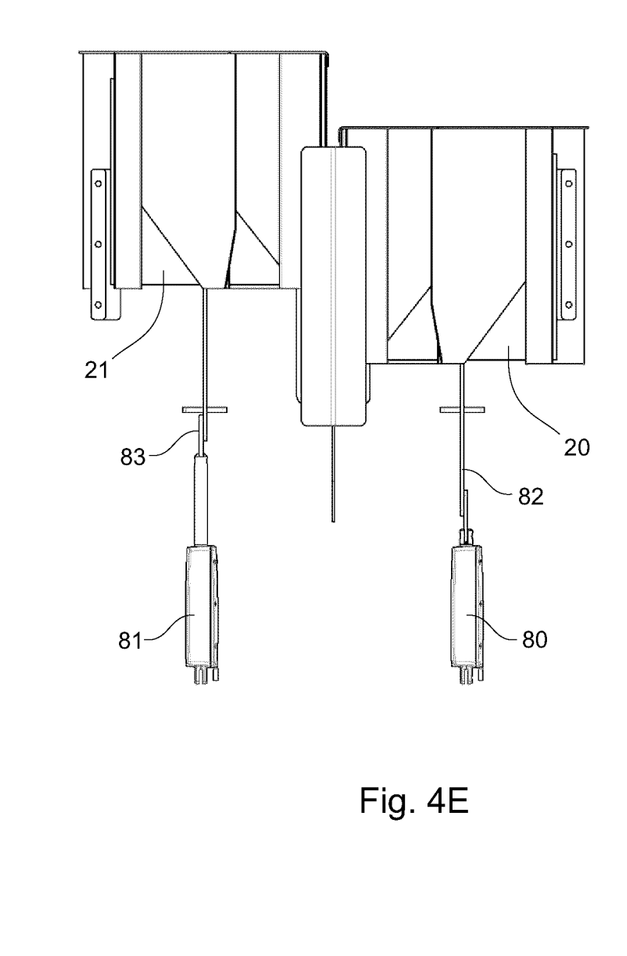
FIG. 4E depicts a magnified view of first and second flow dividers shown in FIG. 4D.
Figure 5A:
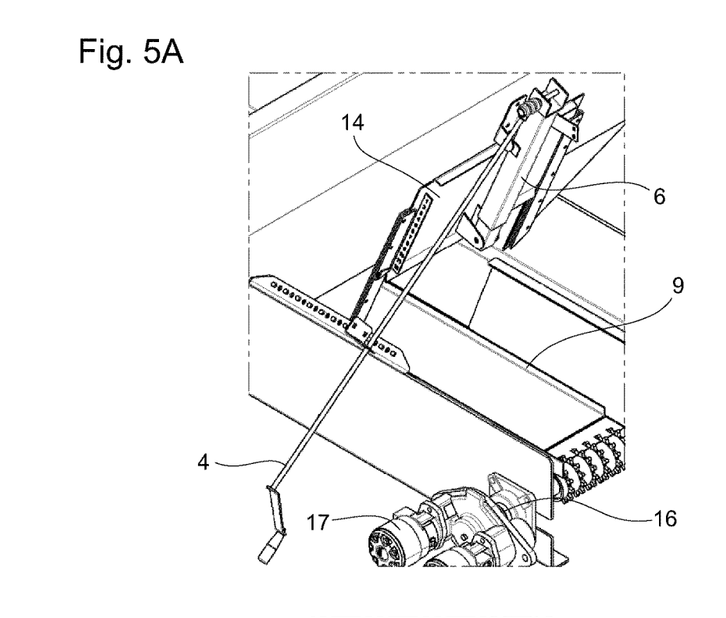
FIG. 5A depicts a gate region of the spinner spreader of FIG. 1A with a gate raised away from a conveyor of the spreader.
Figure 5B:
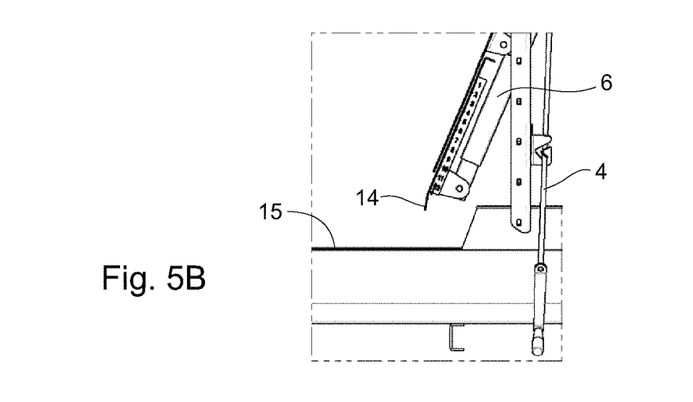
FIG. 5B depicts a magnified view of FIG. 5A.
Figure 5C:
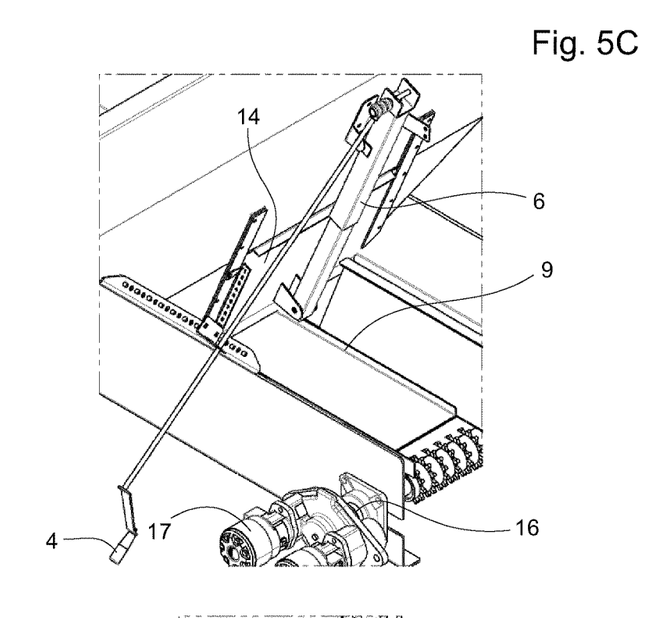
FIG. 5C depicts the gate region of FIG. 5A with the gate lowered closer to the conveyor.
Figure 5D:
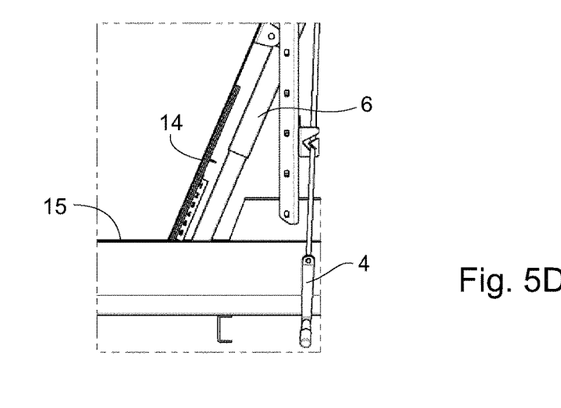
FIG. 5D depicts a magnified view of FIG. 5C.

As best seen in FIG. 4A to FIG. 4E, while the flow dividers 20, 21 are each a rigid structure in which the troughs are not independently moveable therein, the flow dividers 20, 21 themselves are independently translatable longitudinally, but are not moveable substantially laterally. The first and second flow dividers 20, 21 are independently translatable by virtue of first and second actuators 80, 81 mounted on rails of the hopper 5 of the spinner spreader 1. Any suitable actuators may be utilized, for example hydraulic cylinders, linear actuators, pneumatic actuators, mechanical actuators (e.g. rack and pinion mechanisms) or any combination thereof. The first and second actuators 80, 81 are linked to respective first and second flow dividers 20, 21 by first and second longitudinally oriented linkage arms 82, 83, respectively. The first and second actuators 80, 81 are independently controlled to independently translate the first and second flow dividers 20, 21 longitudinally. FIG. 4B and FIG. 4C illustrate the flow divider 20 in a most rearwardly translated longitudinal position (FIG. 4C) and a most forwardly translated longitudinal position (FIG. 4D). The flow dividers 20, 21 are each preferably translatable through a total distance such that the discharge openings always remain over the respective spinner discs 40, 41 to prevent loss of particulate material. The ability to translate the flow dividers 20, 21 with respect to the respective spinner discs 40, 41 permits moving the drop points for the particulate material on the spinner discs 40, 41 to different positions along the longitudinally oriented drop lines. With reference to FIG. 4D, preferably, the drop points P and Q are longitudinally adjustable along the drop lines on the lines X-X and Y-Y, respectively, at a distance in a range of about 2-12 inches from the center C0 of the spinner disc 40.

Having two laterally spaced apart longitudinally oriented drop lines on a given spinner disc and the ability to control the longitudinal position of the drop points on the drop lines contributes to the ability to provide a uniform distribution pattern of the particulate material on the ground surface. Being able to independently control the longitudinal position of the the two drop points on the first spinner disc 40 in relation to the longitudinal position of the the two drop points on the second spinner disc 41 permits adjusting the distribution pattern to accommodate ground surface conditions on the sides of the spinner spreader 1.

Referring specifically to FIG. 5A, FIG. 5B, FIG. 5C and FIG. 5D, situated at the rear hopper door 8 is a vertically movable gate 14 that can be adjusted to block at least a portion of the door 8 in order to meter the amount of particulate material leaving the hopper 5, thereby metering the amount of particulate material provided to the flow dividers 20, 21, thereby metering the amount of particulate material discharged to the spinner discs 40, 41. The gate 14 may be raised and lowered in any suitable manner, for example with a manual actuator comprising a hand crank 4 operatively linked to a telescoping tube-in-tube arrangement 6 connected to the gate 14, although other kinds of actuators such as hydraulic cylinders, linear actuators and the like may be utilized instead of or in addition to a mechanical actuator. The ability to control the amount of the particulate material that the flow dividers 20, 21 receive from the hopper 5 contributes to the ability to provide a uniform distribution pattern of the particulate material on the ground surface.

Typical spinner spreaders have a single, unchangeable drop point on each of the spinner discs. By providing two drop points on each spinner disc, it has been found that the uniformity of distribution pattern of the particulate material on the ground surface can be improved. Further, being able to change the longitudinal positions of the two drop points on the spinner disc provides further control over the spread pattern. Furthermore, being able to independently control the drop points on one of the spinner discs in relation to the drop points on another spinner disc permits independent control over spread pattern on each side of the spinner spreader. Such control over the positions of the drop points coupled with control over the conveyance speed of the particulate material, the rotational speed of the rotatable disc and/or the amount of particulate material discharged to the rotational disc provides exceptional flexibility to control spread pattern of the particulate material on the ground surface under a variety of environmental conditions.

A series of field tests was performed on a spinner spreader of the present invention to determine uniformity of spread pattern of various types of particulate material at various broadcast distances in a range of from about 9-50 meters. Field tests were performed by operating the spreader in a field to provide lap patterns of the particulate materials. Collectors were placed on the centerline of the track of the spreader and every 4.6 m up to 23 m to each side of the spreader to collect particulate material as the particulate material was broadcast from the spreader. Lap patterns at 9.1 m, 20.1 m, 21.9 m, 26.8 m, 31.7 m, 36.6 m, 42.7 m and 48.8 m were tested. The amount of particulate material in each collector was then measured.

The results showed that for each broadcast distance up to 36.6 m the amount of particulate material collected in each of the collectors up to the respective broadcast distance was about the same, indicating a uniform spread pattern for all the particulate materials tested at all of the broadcast distances up to 36.6 m. For broadcast distances of 42.7 m and 48.8 m, uniform spread patterns were found for many, but not all, of the particulate materials tested.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. An apparatus for spreading particulate material, the apparatus comprising:

a bin for holding particulate material;

a rotatable disc for broadcasting the particulate material to a ground surface, the rotatable disc oriented to have an upper surface for receiving the particulate material;

a conveyor for conveying the particulate material in a particulate material path from the bin to the upper surface of the rotatable disc;

a longitudinally adjustable flow divider situated in the particulate material path between the bin and the rotatable disc, the flow divider receiving particulate material from the conveyor and dividing the particulate material so that the particulate material is dischargeable on to the upper surface of the rotatable disc on first and second laterally spaced apart longitudinally oriented drop lines; and, an actuator operably connected to the flow divider to adjust a longitudinal position of the flow divider to longitudinally adjust drop points on the drop lines at which the particulate material is dischargeable on to the rotatable disc.

2. The apparatus of claim 1, wherein the first and second drop lines are the only drop lines, and wherein the flow divider comprises first and second channels that receive the particulate material from the conveyor and discharge the particulate material at the drop points on the first and second drop lines, respectively, the first and second channels immovable with respect to each other and movable with the flow divider to longitudinally adjust the drop points of the particulate material on the drop lines on the rotatable disc.

3. The apparatus of claim 2, wherein the flow divider further comprises a base, immovable walls extending upwardly from the base and an immovable splitter extending upwardly from the base, the immovable walls and the immovable splitter defining the first and second channels, each channel comprising a funnel at a top of the channel for receiving the particulate material from the conveyor and a discharge opening in the base at a bottom of the channel for discharging the particulate material on to the rotatable disc, the discharge openings of the first and second channels being laterally spaced apart to permit discharge of the particulate material on the first and second laterally spaced apart longitudinally oriented drop lines.

4. The apparatus of claim 3, wherein the first and second channels each comprise a particulate material receiving surface, the receiving surface downwardly sloped at a non-90-degree angle from the top to the bottom of the channel.

5. The apparatus of claim 2, wherein the particulate material is divided equally between the first and second channels.

6. The apparatus of claim 1, wherein the rotatable disc has a center and the drop points are longitudinally adjustable along the drop lines at a distance in a range of about 2-12 inches from the center of the rotatable disc.

7. The apparatus of claim 1, wherein the rotatable disc has fins of different lengths on the upper surface thereof, the fins assisting with broadcasting the particulate material from the rotatable disc.

8. The apparatus of claim 1, wherein the rotatable disc comprises first and second rotatable discs laterally spaced apart across a longitudinal centerline between the discs and the longitudinally adjustable flow divider comprises first and second longitudinally independently adjustable flow dividers positioned to discharge the particulate material on the first and second rotatable discs, respectively.

9. The apparatus of claim 8, wherein the laterally spaced apart longitudinally oriented drop lines on each of the first and second rotatable discs are between the longitudinal centerline of the apparatus and longitudinal centerlines of the respective rotatable discs.

10. A method of controlling distribution pattern of a particulate material broadcast to a ground surface by a spreading apparatus, the method comprising:

conveying the particulate material from a bin to a rotatable disc for broadcasting the particulate material to the ground surface, the rotatable disc oriented to have an upper surface for receiving the particulate material thereon;

dividing the particulate material into first and second portions;

discharging the first portion of particulate material to a first drop point on the upper surface of the rotatable disc on a first longitudinally oriented drop line;

discharging the second portion of particulate material to a second drop point on the upper surface of the rotatable disc on a second longitudinally oriented drop line spaced apart laterally from the first drop line; and, rotating the rotatable disc to broadcast the particulate material in a uniform distribution pattern on the ground surface.

11. The method of claim 10, further comprising adjusting a longitudinal position of the first and second drop points on the first and second longitudinally oriented drop lines on the upper surface of the rotatable disc to provide the uniform distribution pattern of the particulate material on the ground surface.

12. The method of claim 10, further comprising adjusting one or more of conveyance speed of the particulate material, rotational speed of the rotatable disc and amount of particulate material discharged to the rotational disc to provide the uniform distribution pattern of the particulate material on the ground surface.

13. The method of claim 10, wherein the rotatable disc has a center and the drop points are longitudinally adjustable along the drop lines at a distance in a range of about 2-12 inches from the center of the rotatable disc.

14. The method of claim 10, wherein the rotatable disc has fins of different lengths on the upper surface thereof, the fins assisting with broadcasting the particulate material from the rotatable disc.

15. The method of claim 10, wherein the rotatable disc comprises first and second rotatable discs laterally spaced apart across a longitudinal centerline between the discs and the particulate material is discharged to both the first and second rotatable discs.

16. The method of claim 15, wherein the laterally spaced apart longitudinally oriented drop lines on each of the first and second rotatable discs are between the longitudinal centerline between the discs and longitudinal centerlines of the respective rotatable discs.

17. A flow divider for a particulate material spreading apparatus, the flow divider comprising:

a base;

immovable walls extending upwardly from the base;

and an immovable splitter extending upwardly from the base, the immovable walls and the immovable splitter defining first and second channels, the first and second channels immovable and laterally situated with respect to each other in relation to a longitudinal axis of the spreading apparatus, each channel comprising a funnel at a top of the channel for receiving particulate material from a conveyor of the apparatus and a discharge opening in the base at a bottom of the channel for discharging the particulate material on to a same rotatable disc of the apparatus, the discharge openings of the first and second channels being laterally spaced apart, the first and second channels each further comprising a particulate material receiving surface, the receiving surface downwardly sloped at a non-90-degree angle from the top toward the bottom of the channel.

18. The flow divider of claim 17, wherein the splitter comprises first and second plate portions upwardly extending from the base and meeting at a top of the splitter to form a peak that divides the particulate material received from the conveyor between the first and second channels.

19. The flow divider of claim 18, wherein at least portions of the first and second plate portions extend upwardly at non-90-degree angles, and wherein at least one of the plate portions forms the particulate material receiving surface of at least one of the channels.

20. The apparatus of claim 1, wherein:

the flow divider comprises first and second channels that receive the particulate material from the conveyor and discharge the particulate material at drop points on the first and second drop lines, respectively, the first and second channels immovable with respect to each other and movable with the flow divider to longitudinally adjust the drop points of the particulate material on the drop lines on the rotatable disc; and, the flow divider further comprises a base, immovable walls extending upwardly from the base and an immovable splitter extending upwardly from the base, the immovable walls and the immovable splitter defining the first and second channels, each channel comprising a funnel at a top of the channel for receiving the particulate material from the conveyor and a discharge opening in the base at a bottom of the channel for discharging the particulate material on to the rotatable disc, the discharge openings of the first and second channels being laterally spaced apart to permit discharge of the particulate material on the first and second laterally spaced apart longitudinally oriented drop lines.

* * * * *